US012769718B2

(12) United States Patent
Roh et al.

(10) Patent No.: US 12,769,718 B2
(45) Date of Patent: Oct. 20, 2026

(54) METHOD AND SYSTEM FOR SEARCHING FOR NEAREST NEIGHBORS IN THE CARDINALITY-BASED VECTOR DATABASE

(71) Applicant: Dnotitia Inc., Seoul (KR)

(72) Inventors: Hong Chan Roh, Seongnam-si (KR); Moo Kyoung Chung, Yongin-si (KR); Moo Hyeon Nam, Seoul (KR)

( * ) Notice: Subject to any disclaimer, the term of this patent is extended or adjusted under 35 U.S.C. 154(b) by 0 days.

(21) Appl. No.: 19/193,040

(22) Filed: Apr. 29, 2025

(65) Prior Publication Data

US 2025/0335412 A1 Oct. 30, 2025

(30) Foreign Application Priority Data

Apr. 30, 2024 (KR) ........................ 10-2024-0057959

(51) Int. Cl.
*G06F 16/22* (2019.01)
*G06F 16/2458* (2019.01)

(52) U.S. Cl.
CPC ...... *G06F 16/2237* (2019.01); *G06F 16/2462* (2019.01)

(58) Field of Classification Search
CPC ............. G06F 16/2237; G06F 16/2462; G06F 16/24565; G06F 16/221; G06F 16/285; G06F 18/24147; G06F 2201/81
USPC .......................................................... 707/736
See application file for complete search history.

(56) References Cited

U.S. PATENT DOCUMENTS 11,645,585 B2 5/2023 Bortnikov et al.
2021/0406321 A1* 12/2021 Li ........................ G06F 16/2237
2022/0374432 A1* 11/2022 Akerib .............. G06F 16/24553

FOREIGN PATENT DOCUMENTS

JP 2023-15914 A 2/2023
KR 10-2022-0158209 A 11/2022
WO WO-2020060605 A1 * 3/2020 ......... G06F 16/3347

OTHER PUBLICATIONS

Notice of Grounds for Rejection for Korean Patent Application No. 10-2024-0057959, dated Apr. 27, 2026 and issued by Korean Intellectual Property Office (machine translation attached).

* cited by examiner

*Primary Examiner* — Michael Pham
(74) *Attorney, Agent, or Firm* — USX IP LLC

(57) ABSTRACT

Provided are a method and system for searching for a nearest neighbor in a cardinality-based vector database. Cardinality data of a filtering condition column is statistically processed and recorded, and a data filtering and search method is determined by comparing the recorded data with a predetermined threshold value. When the cardinality data is higher than the threshold value, general data filtering and k-nearest neighbor (KNN) search are performed. When the cardinality data is lower than the threshold value, a hierarchical navigable small world (HNSW) algorithm is used, and a search space is expanded by modifying a search algorithm based on an inverse value of the cardinality or a filter combination probability. In this case, the ef-search value is increased by a corresponding multiple to expand a search space in a greedy search process for a candidate set removed by filtering. The predetermined threshold value may be determined when the number of cardinality eigenvalues is 25 or more or when the filter combination probability is 4% or less.

4 Claims, 3 Drawing Sheets

METHOD AND SYSTEM FOR SEARCHING FOR NEAREST NEIGHBORS IN THE CARDINALITY-BASED VECTOR DATABASE

CROSS-REFERENCE TO RELATED APPLICATION

This application claims priority to and the benefit of Korean Patent Application No. 10-2024-0057959, filed on Apr. 30, 2024, the disclosure of which is incorporated herein by reference in its entirety.

BACKGROUND

1. Field of the Invention

The present invention relates to a vector database, and more particularly, to a method and system for searching for a nearest neighbor in a vector database.

2. Discussion of Related Art

In machine learning or artificial intelligence, a process of converting data recognized by humans into data recognized by artificial intelligence is called data embedding which mainly converts text, voice, and images into vector data.

A vector database is a database that stores vector data and in which a search is performed based on a similarity between the stored vectors, and the vector database is widely used in the field of artificial intelligence.

In such a vector database, a nearest neighbor search refers to a process of finding a data point closest to a given point in a multidimensional space. This method plays an important role in various fields such as machine learning, databases, and information retrieval. In particular, an approximate nearest neighbor (ANN) search is a technology that sacrifices some accuracy to reduce computational costs and is widely used because of its efficiency in terms of large-scale data sets. That is, the ANN may ease off on accuracy to some extent, and thus enable a faster and more scalable search, which is important for handling large data sets or high-dimensional data spaces.

For the high-dimensional data search, measuring an angle between two vectors rather than a direct distance may better handle sparsity, and therefore, is often effective. The ANN utilize techniques such as locality sensitive hashing (LSH) or hierarchical navigable small world (HNSW) to more efficiently search a high-dimensional search space to focus the search and avoid unnecessary computations, thereby increasing a process speed and reducing computational requirements.

Such the ANN search considers factors such as the tolerance of applications for sacrificed parts, the size and dimension of the data set, and the quality of the data being embedded. For example, the ANN search suffers from performance degradation when integrated with data filtering, and search performance may vary significantly depending on the filtering condition of data, which is largely dependent on the number of eigenvalues (cardinality, hereinafter referred to as cardinality) of the filtering condition. When the filtering with high cardinality is applied during the ANN search process, many neighboring nodes are excluded from the search, which lowers the recall accuracy. As a result, there is a need for a method of improving accuracy.

SUMMARY OF THE INVENTION

The present invention is directed to optimizing performance of an approximate nearest neighbor (ANN) search by taking into consideration cardinality of a filtering condition in a vector database search.

According to an aspect of the present invention, a method of searching for a nearest neighbor in a cardinality-based vector database includes statistically processing and recording cardinality data of a filtering condition column and comparing the recorded statistic cardinality data with a predetermined threshold value to determine a data filtering and search method. The determination is made such that when the cardinality data is higher than the predetermined threshold value, general data filtering and a k-nearest neighbor (KNN) search for a result thereof are performed. The determination is made such that when the cardinality data is lower than the predetermined threshold value, a search for neighboring nodes that do not satisfy the filtering condition is not performed during the search, and a determination is made such that a search is performed by modifying a search algorithm to expand a search space to a multiple of an inverse value of the cardinality or a filter combination probability. When the cardinality data is lower than the predetermined threshold value, the searching for the nearest neighbor may use a hierarchical navigable small world (HNSW) algorithm and expand a search space in a greedy search process for a candidate set removed by filtering by increasing a value of an ef-search by a corresponding multiple, in which the predetermined threshold value may be determined to be a threshold value when the number of cardinality eigenvalues is 25 or more or determined to be a threshold value when a probability of combination of a filtering condition is 4% or less.

BRIEF DESCRIPTION OF DRAWINGS

The above and other objects, features, and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
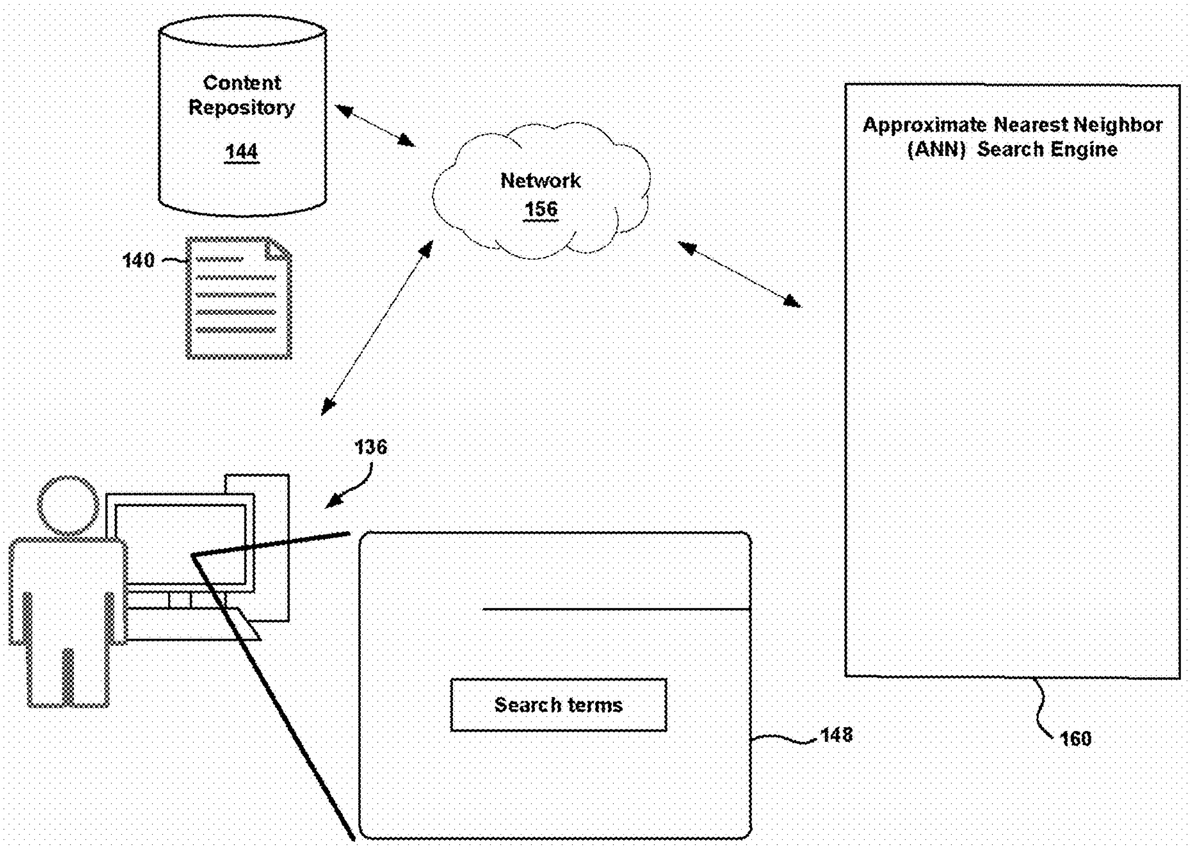
FIG. 1 illustrates an example of an approximate nearest neighbor (ANN) system to which the present invention is applied.

After terms used in this specification are briefly described, embodiments of the present invention will be described in detail. General terms that are currently widely used are selected as terms used in embodiments in consideration of functions in the present specification but may be changed depending on the intention of those skilled in the art or a judicial precedent, the emergence of a new technique, and the like. In addition, in specific cases, terms arbitrarily chosen by an applicant may exist. In this case, the meaning of such terms will be mentioned in detail in a corresponding description portion of the present invention. Therefore, the terms used in this specification are to be defined on the basis of the meaning of the terms and the contents throughout the disclosure rather than simple names of the terms.

The terms "module" and "unit" for components used in the following description are used only to easily provide disclosure. Therefore, these terms do not have meanings or roles that distinguish them from each other inherently. Further, when it is decided that a detailed description for known art related to the description of the embodiment disclosed in this specification may obscure the gist of the embodiment disclosed in this specification, the detailed description will be omitted.

In the following description, when any one part is referred to as being "connected (joined, contacted, and coupled) to" another part, it means that any one part and another part are "directly connected (joined, contacted, and coupled) to" each other or are "indirectly connected (joined, contacted, and coupled) to" each other with still another part interposed therebetween. In addition, unless explicitly described to the contrary, "including (comprising or providing)" any component will be understood to imply including (comprising or providing) other components rather than the exclusion of other components.

Terms used in this specification are used only in order to describe specific embodiments rather than limiting the present disclosure. The singular expression includes a plural expression unless the context clearly indicates otherwise, and components implemented in a dispersed form may be implemented in a combined form unless there is a special limitation thereon. It should be further understood that the terms "include" and "have" used in the present specification specify the presence of features, numerals, steps, operations, components, parts mentioned in the present specification, or combinations thereof, but do not preclude the presence or addition of one or more other features, numerals, steps, operations, components, parts, or combinations thereof.

Terms including an ordinal number such as first, second, or the like used in the present specification may be used to describe various components. However, these components are not limited to these terms. The terms are used to distinguish one component from another component. For example, the first component may be named the second component and the second component may also be similarly named the first component, without departing from the scope of the present invention.

FIG. 1 illustrates an example of an ANN system 100 to which the present invention is applied.

Referring to FIG. 1, the ANN system may include at least one of a computing device 136, a document 140, a content repository 144, a user interface 148, a network 156, and an approximate nearest neighbor (ANN) search device 160.

A user utilizing the computing device 136 adds the document 140 to the content repository 144 and enables the document 140 to be searched for within the content repository 144. One or more areas, search terms, or keywords for designation included in the user interface 148 are provided to the user through a display of the computing device 136. That is, the user may input a keyword into the user interface 148, and the keyword is provided to the ANN search device 160 through the network 156. The ANN search device 160 finds a document that is semantically most similar to a keyword provided in a query and provides the found document to the computing device 136.

For example, the ANN search device 160 may receive content from the content repository 144 and generate one or more vector indexes for a search.

As another example, the ANN search device 160 may apply a deep learning model to a portion of the content repository 144 and generate a vector index. Alternatively, an index (or vector index) regarding the ANN algorithm may be pre-stored and utilized.

As another example, when a user adds a document to the content repository 144, the ANN search device 160 may generate a vector representing the added document and utilize vector addition to add the generated vector to the existing index.

As another example, when content is deleted or removed from the existing index, the ANN search device 160 may remove the corresponding vector or vector index.

As another example, the ANN search device may operate by generating a searchable data set, applying a deep learning model to the generated data set, and generating one or more vectors. In this case, the generated one or more vectors may represent a portion of the data set, and the data set may include keywords, web pages, documents, images, videos, etc. In addition, the deep learning model may generate vectors related to each web page, document, image, or video. Each vector may be indicated by nodes, and each node may indicate a list of nearest nodes. As a result, when a user wants to query a data set regarding the most similar content, the deep learning model generates a vector indicated by the query, and the vector index is searched for using the generated vector.

Hereinafter, the method of searching for a nearest neighbor in a cardinality-based vector database according to the present invention will be described. The method may be executed by a computer system and executed as a set of computer-executable instructions encoded or stored in a computer-readable medium. In addition, the method may be performed by gates or circuits associated with a processor, an application-specific integrated circuit (ASIC), a field programmable gate array (FPGA), a system on chip (SoC), or other hardware devices. The method receives a vector representing content to be added to a search index. In this case, the received vector may be applied to the results of the deep learning model operating on the content, and the content to be added may be keywords, web pages, documents, images, etc.

Figure 2:
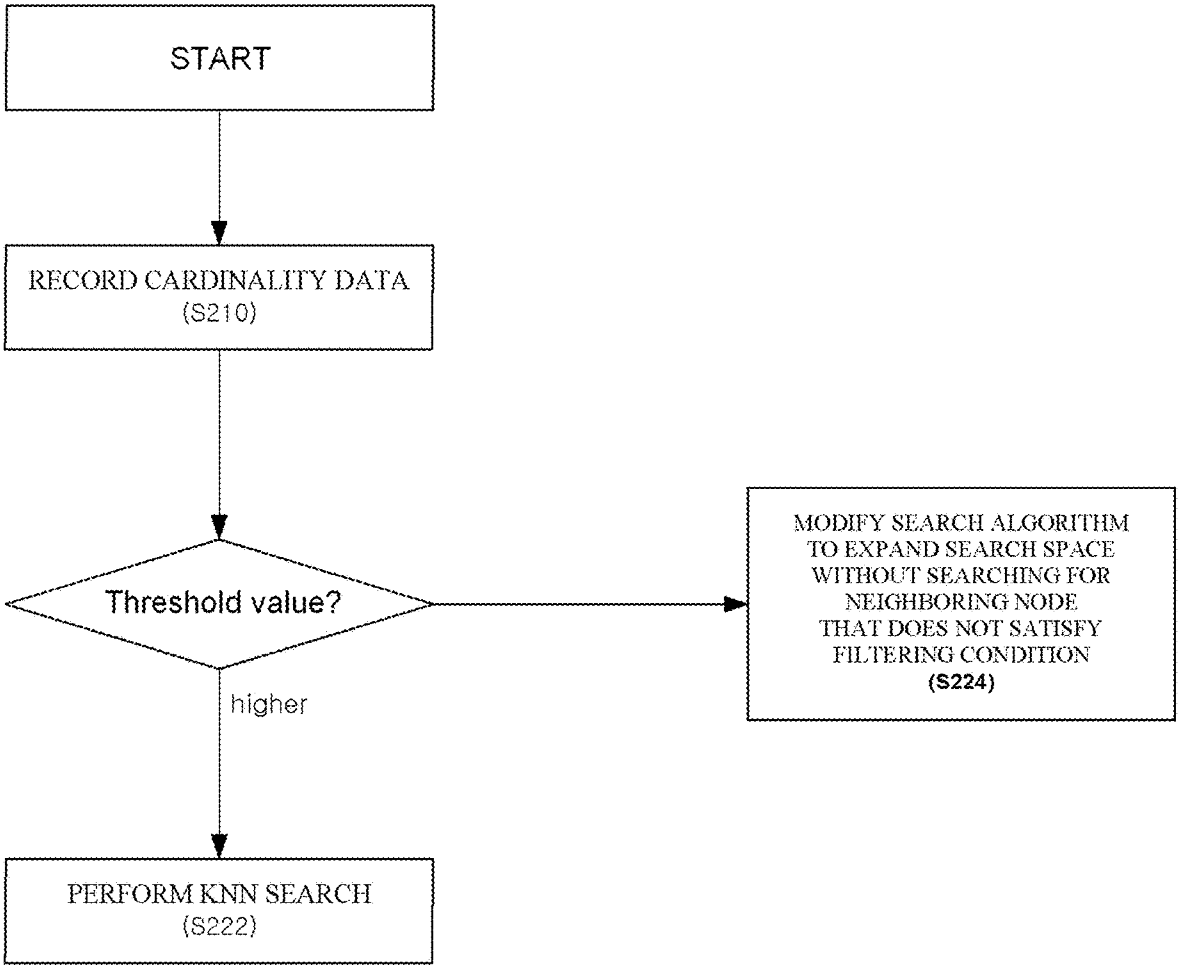
FIG. 2 is a flowchart illustrating an example of a method of searching for a nearest neighbor in a cardinality-based vector database according to the present invention.

FIG. 2 is a flowchart illustrating an example of a method of searching for a nearest neighbor in a cardinality-based vector database according to the present invention.

Referring to FIG. 2, cardinality data of a filtering condition column used as a criterion for performance optimization in a filtering process is statistically processed and recorded (S210).

Next, the method includes comparing the recorded statistic cardinality data with a predetermined threshold value to determine a data filtering and search method (S220).

As an example, a determination is made such that, when the cardinality data is higher than the predetermined threshold value, general data filtering and an accurate k-nearest neighbor (KNN) search for a result thereof are performed (S232). For example, the KNN search may be a search that classifies data into a category that includes more data than neighboring data, and various published methods for compensating for KNN may also be applied to the present invention.

As another example, a determination is made such that when the cardinality data is lower than the predetermined threshold value, a search for neighboring nodes that do not satisfy the filtering condition is not performed during the ANN search, and a determination is made such that the search is performed by modifying a search algorithm to expand a search space to a multiple of an inverse value of the cardinality or filter combination probability (S224). For example, when using a hierarchical navigable small world (HNSW) algorithm, a value of an ef-search increases by a multiple to appropriately expand a search space during a greedy search process for a candidate set removed due to filtering.

This is to compensate for the fact that the search space is reduced and accuracy is lowered when the search for neighboring nodes that do not satisfy the filtering condition is not performed during the ANN search.

Meanwhile, as an example according to the present invention, in operation S220, an embodiment of determining the predetermined threshold value is as follows.

As an example, as the cardinality data criterion when applying the filtering, the threshold value may be determined when the number of cardinality eigenvalues is 25 or more.

As another example, the cardinality data criterion when applying the filtering may be determined to be the threshold value when the probability of combination of a filtering condition is 4% or less.

A basis for determining the threshold value may be that, when performing a benchmark on the ANN index, an average qps performance based on 95% accuracy (or recall) is about 30 times faster than the KNN method. In other words, the performance gain is about 30 times greater based on a reasonable accuracy (e.g., 95%) even though the results are somewhat inaccurate, so the threshold value according to the present invention is effective.

Meanwhile, when the data set itself is reduced to about 1/30 only by the filtering, the same level of performance is shown, but on the contrary, when in-line filtering is applied while traversing the ANN index, the performance difference is not great, but the damage caused the accuracy loss is greater. That is, the ANN index itself has the advantage of greatly improving performance in log scale, but when an additional search is performed using an inline filter, the damage thereof is greater, and thus no performance gain may be seen.

According to the present invention, a new search method may be provided that may solve the problem of search performance that varies depending on a filtering condition and optimize the integration of the data filtering and the ANN search to achieve higher performance and accuracy.

Figure 3:
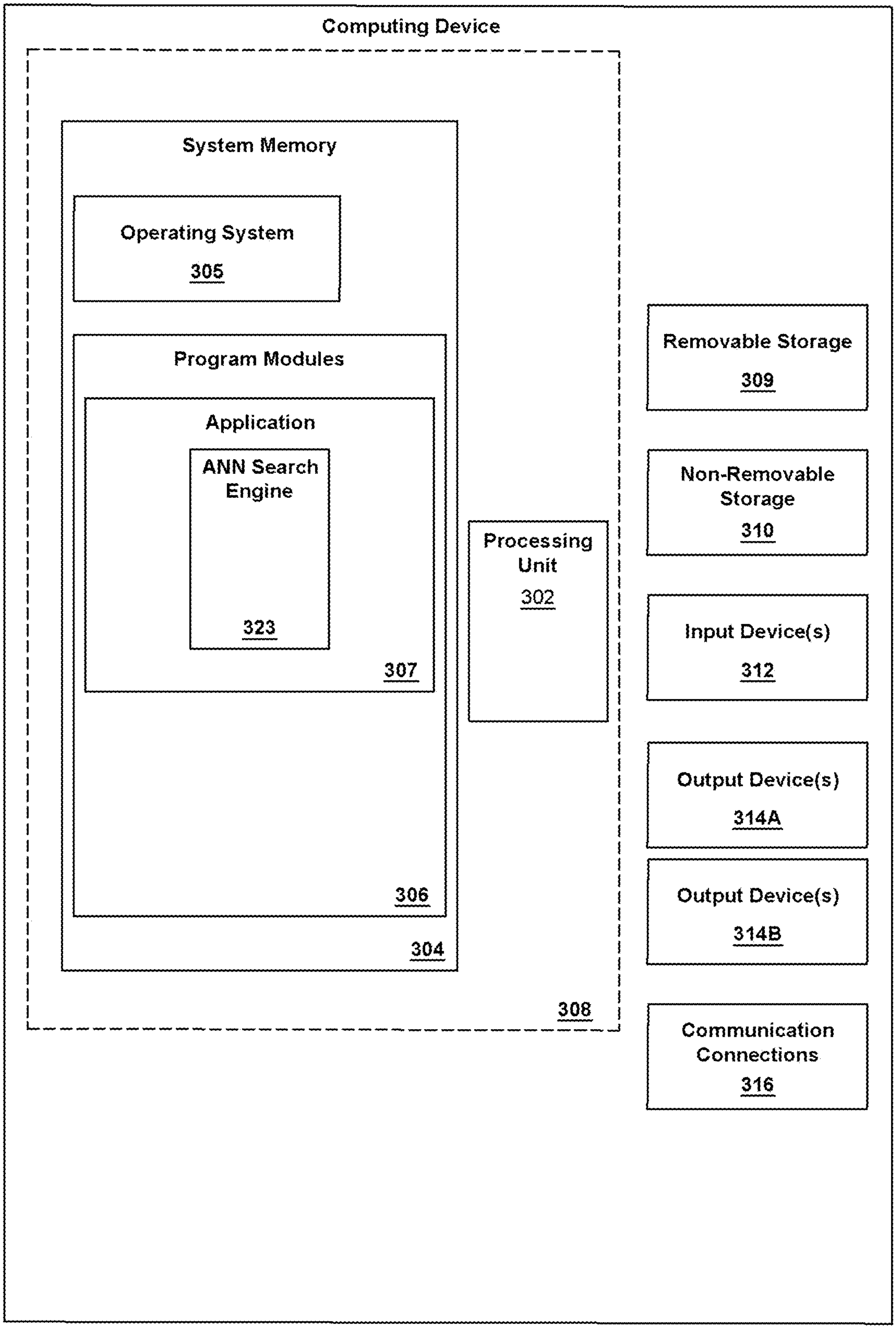
FIG. 3 is a block diagram illustrating an example of a computing device according to the present invention.

FIG. 3 is a block diagram illustrating an example of a computing device according to the present invention.

Referring to FIG. 3, a computing device 300 may include at least one processor 302 and a system memory 304. Depending on the configuration and type of the computing device, the system memory 304 may be a volatile repository, a nonvolatile repository, a flash memory, or a combination thereof.

The system memory 304 may include one or more program modules 306 suitable for executing an operating system 305 and a software application 320 but is not limited to an ANN search device 323 and/or one or more components supported by the ANN search device 323. The system described herein, for example, the ANN search device may receive content that is added, deleted, or searched for. In addition, the operating system 305 may be suitable for controlling the operation of the computing device 300.

Furthermore, the embodiment of the present disclosure may be implemented in conjunction with a graphics library, other operating systems, or any other application programs and are not limited to any particular application or system.

The computing device 300 may have additional features or functionality. For example, the computing device 300 may also include additional data storage devices (removable and/or non-removable storage devices), such as magnetic disks, optical disks, or tapes.

As described above, a number of program modules and data files may be stored in the system memory 304. While executed on at least one processor 302, the program modules 306 may perform processes including, but not limited to, one or more aspects. Other program modules that may be used in accordance with the present invention may include e-mail and contact applications, word processing applications, spreadsheet applications, database applications, slide presentation applications, drawing or computer-aided application programs, etc.

Furthermore, the embodiment of the present invention may be implemented in individual electronic components, packages or integrated electronic chips including logic gates, circuits utilizing microprocessors, or electrical circuits including single chips including electronic components or microprocessors. For example, an embodiment of the present invention may be implemented such that each component or multiple components of FIG. 3 are executed through an SoC or integrated into a single integrated circuit. Such an SoC device may include one or more processing devices, graphics devices, communication devices, system virtualization devices, and various application functions, all of which may be integrated on a chip substrate as a single integrated circuit.

The term "computer-readable media" used herein may include computer storage media. The computer storage media may include volatile and nonvolatile as well as removable and non-removable media implemented in any method or technology for storing information, such as computer-readable instructions, data structures, or program modules. The system memory 304, the removable storage device 309, and the non-removable storage device 310 are all examples of the computer storage media, and may include a random-access memory (RAM), a read-only memory (ROM), an electrically erasable ROM (EEPROM), flash memory or other memory technology, a compact disc (CD)-ROM, a digital versatile disk (DVD) or other optical storage devices, or a magnetic cassette, a magnetic tape, a magnetic disk storage device, or other magnetic storage devices. Alternatively, they may include other magnetic storage devices or any other manufactured items that may be used to store information and accessed by the computing device 300. Any computer storage media may be part of the computing device 300.

According to the present invention, it is possible to achieve higher performance and accuracy in a nearest neighbor search after performing data filtering.

According to the present invention, it is possible to achieve higher performance and accuracy by optimizing an integration of data filtering and an ANN search.

Exemplary embodiments of the present invention described above have been disclosed for illustrative purposes, and those skilled in the art with ordinary knowledge of the present invention will be able to make various modifications, changes, and additions within the spirit and scope of the present invention, and these modifications, changes, and additions should be regarded as falling within the scope of the following claims.

Those of ordinary skill in the art to which the present invention pertains may make various substitutions, modifications, and changes within the scope not departing from the technical idea of the present invention, and thus the present invention is not limited by the above-described embodiments and accompanying drawings.

What is claimed is:

1. A method of searching for a nearest neighbor in a cardinality-based vector database, the method comprising:
   statistically processing and recording cardinality data of a filtering condition column; and
   comparing the recorded cardinality data with a predetermined threshold value to determine a data filtering and search method,
   wherein when the cardinality data is higher than the predetermined threshold value, general data filtering and a k-nearest neighbor (KNN) search for a result thereof are performed, and
   wherein when the cardinality data is lower than the predetermined threshold value, (i) a search for neighboring nodes that do not satisfy a filtering condition is not performed during an approximate nearest neighbor (ANN) search, and (ii) the ANN search for the nearest neighbor in the vector database is performed using a hierarchical navigable small world (HNSW) algorithm by expanding a search space during a greedy search process of the HNSW algorithm for a candidate set removed due to filtering the search space being expanded by increasing a value of an ef-search by a multiple of an inverse value of the cardinality data or a filter combination probability.

2. The method of claim 1, wherein the predetermined threshold value is determined to be a threshold value when a number of cardinality eigenvalues is 25 or more or determined to be a threshold value when a probability of combination of the filtering condition is 4% or less.

3. A computing device for performing a method of searching for a nearest neighbor in a cardinality-based vector database, the computing device comprising:
   at least one processor; and
   a system memory that executes an operating system and a software application,
   wherein the system memory records statistically processed cardinality data of a filtering condition column,
   the processor compares the recorded cardinality data with a predetermined threshold value to determine a data filtering and search method,
   wherein when the cardinality data is higher than the predetermined threshold value, general data filtering and a k-nearest neighbor (KNN) search for a result thereof are performed by the processor, and
   wherein when the cardinality data is lower than the predetermined threshold value, (i) a search for neighboring nodes that do not satisfy the filtering condition is not performed during an approximate nearest neighbor (ANN) search, and (ii) the ANN search for the nearest neighbor in the vector database is performed by the processor using a hierarchical navigable small world (HNSW) algorithm by expanding a search space during a greedy search process of the HNSW algorithm for a candidate set removed due to filtering, the search space being expanded by increasing a value of an ef-search by a multiple of an inverse value of the cardinality data or a filter combination probability.

4. The computing device of claim 3, wherein the system memory stores the predetermined threshold value determined to be a threshold value when a number of cardinality eigenvalues is 25 or more or determined to be a threshold value when a probability of combination of the filtering condition is 4% or less.

* * * * *